(12) United States Patent
Illanes

(10) Patent No.: US 11,811,274 B1
(45) Date of Patent: Nov. 7, 2023

(54) POWER GENERATING DEVICE BY MAGNETIC COLLAPSE

(71) Applicant: Magnetech S.A.C., Lima (PE)

(72) Inventor: Jose Illanes, Lima (PE)

(73) Assignee: Magnetech S.A.C., Lima (PE)

( * ) Notice: Subject to any disclaimer, the term of this patent is extended or adjusted under 35 U.S.C. 154(b) by 0 days.

(21) Appl. No.: 17/833,882

(22) Filed: Jun. 6, 2022

(51) Int. Cl.
*H02K 11/215* (2016.01)
*H02K 7/00* (2006.01)
*H02N 15/00* (2006.01)

(52) U.S. Cl.
CPC .......... *H02K 11/215* (2016.01); *H02K 7/003* (2013.01); *H02N 15/00* (2013.01)

(58) Field of Classification Search
CPC ....... H02K 11/215; H02K 7/003; H02N 15/00
USPC .......................................................... 310/263
See application file for complete search history.

(56) References Cited

U.S. PATENT DOCUMENTS

| | | | | |
|---|---|---|---|---|
| 4,079,277 A * | 3/1978 | Osanai | .................... | H02K 23/54 310/90 |
| 4,168,459 A * | 9/1979 | Roesel, Jr. | ........... | H02K 21/046 322/29 |
| 5,982,074 A * | 11/1999 | Smith | ...................... | H02K 3/47 310/179 |
| 6,140,729 A * | 10/2000 | Pollock | .................. | H02K 19/06 318/135 |
| 6,794,776 B1 * | 9/2004 | Gabrys | .................. | H02K 7/025 310/90.5 |
| 7,309,938 B1 * | 12/2007 | Smith | .................... | H02K 47/20 310/156.31 |
| 7,893,588 B1 * | 2/2011 | Jones | ...................... | H02K 21/24 310/156.43 |
| 7,994,675 B2 * | 8/2011 | Jones | ...................... | H02K 21/16 310/156.28 |
| 8,803,384 B2 * | 8/2014 | Hull | ........................ | H02P 25/18 310/179 |
| 10,848,040 B2 * | 11/2020 | Chen | ...................... | H02K 19/38 |
| 2002/0074881 A1 * | 6/2002 | Imlach | .................. | F16C 39/063 310/90.5 |
| 2006/0033392 A1 * | 2/2006 | Ritchey | .................. | H02K 21/12 310/112 |
| 2006/0055270 A1 * | 3/2006 | Petersen | .................. | H02K 3/28 310/156.05 |

(Continued)

FOREIGN PATENT DOCUMENTS

| | | |
|---|---|---|
| KR | 20180051907 | 5/2018 |
| PE | 20200469 | 3/2020 |

(Continued)

*Primary Examiner* — John K Kim
(74) *Attorney, Agent, or Firm* — Sheridan Ross P.C.

(57) ABSTRACT

The present invention is directed to a power generation machine or device, comprising permanent magnets, a three-phase system, bifilar coils and a magnet arrangement disposed axially to the generator rotor; and comprising a system embedded by magnetic pulse control software for the moment of magnetic collapse or generation of electric power peaks or valleys, whereby a set of sensors detect the precise angular moment in which the coils have stored the maximum magnetic energy and then trigger their magnetic collapse or generation of electric power peaks or valleys by a switching process controlled by the signals coming from said sensors. All these elements are arranged in the rotor and circumferential stator, which generates electrical energy when moving.

19 Claims, 17 Drawing Sheets

(56) References Cited

U.S. PATENT DOCUMENTS

| | | | | |
|---|---|---|---|---|
| 2008/0252166 A1* | 10/2008 | Shiga | ................... | H02K 1/2786 |
| | | | | 29/598 |
| 2008/0272664 A1* | 11/2008 | Flynn | ..................... | H02K 21/44 |
| | | | | 310/154.01 |
| 2010/0327687 A1* | 12/2010 | Iannello | ................... | H02K 7/09 |
| | | | | 310/90.5 |
| 2016/0036311 A1* | 2/2016 | Lee | ...................... | H02K 49/104 |
| | | | | 310/103 |
| 2016/0156257 A1* | 6/2016 | Atkins | ................. | H02K 49/102 |
| | | | | 310/74 |
| 2020/0032845 A1* | 1/2020 | McLaughlin | ....... | F16C 32/0482 |
| 2021/0111615 A1 | 4/2021 | Mitri | | |

FOREIGN PATENT DOCUMENTS

| | | |
|---|---|---|
| WO | WO 2009/019001 | 2/2009 |
| WO | WO 2020/160698 | 8/2020 |
| WO | WO 2021/035985 | 3/2021 |
| WO | WO 2021/072561 | 4/2021 |

\* cited by examiner

POWER GENERATING DEVICE BY MAGNETIC COLLAPSE

FIELD

The present invention relates to the field of clean energy generating devices that do not affect the environment by the use of fossil fuels.

BACKGROUND

The planet faces a serious pollution crisis due to high emissions of carbon gas to the atmosphere, which cause global warming that will later lead to serious environmental problems. This is why it becomes clear that it is necessary to look for alternative sources and devices, that can generate clean energy without further affecting the environment by the generation of pollutants, such as carbon, sulfur and/or nitrogen oxides by use of traditional sources that use fossil fuels.

In this regard, document WO21072561 is known in the state of the art of patents, which shows an electrical energy generation, storage and distribution zo system that is activated by kinetic energy. It generates a charge as a result of motion, and includes one or more ion-type batteries, an electronic unit for processing and monitoring the charge and discharge states, a converter/energy transfer device, one or more alternating current generators, a current rectifier, and a galvanic and/or polymeric protection module containing the system and the CHAdeMO and/or CCS ports, depending on the region.

On the other hand, document WO2009019001 refers to a device that includes an arrangement of magnets for generating an alternating magnetic field that interacts with a stationary magnetic field. The device comprises a rotor and a stator disposed coaxially to a rotatably mounted shaft. The rotor comprises one or more first magnet sequences, and the stator comprises one or more second magnet sequences. The first and second magnet sequences each comprise two or more dipole magnets, the arrangement and orientation of which may vary.

Document WO21076429 disclose a system and method, wherein the system is an autonomous power generation and production system that obtains, stores and transfers motor power using one or more magnetic devices. The electrical power is provided from a battery to a motor, the mechanical power is provided from the motor to a generator with the aid of a coupling device, and the electrical power is produced by the generator, which may be directed back to the batteries or to an external source of charge. The enhanced magnetic devices increase output power based on the same input power and may require less input power to produce the same output power.

Moreover, document WO21035985 presents a rotor, an electric motor, an electric motor assembly, a food processor, an air supply device, a household appliance, an electric vehicle, and a power generation device. The rotor comprises a rotating disk and plurality magnetic members, wherein the plurality of magnetic members is provided on the rotating disk and is circumferentially distributed around the central line of rotation of the rotating disk. The use of the rotary disk which weight is relatively light to replace a plurality of layers of silicon steel sheets stacked in the axial direction effectively reduces the weight of the rotor, such that the weight of an electric motor with the rotor is also relatively light, whereby the result is a light-weight electric motor.

Patent WO20160698 discloses a magnetic kinetic energy inertial power generation device, comprising a housing, a stator, a rotor, a permanent magnet, a power generation conductor, and a current output interface. The magnetic kinetic energy inertial energy generation device uses a structure with equal poles that repelling each other to drive the rotor to autonomously continuously rotate and enable the rotor to be suspended, wherein a space where the rotor is located is in a vacuum state.

On the other hand, document KR20180051907 relates to a hybrid power generation device which has a boiler function that can reduce power consumption by providing a weight of fluid to a rotor to generate an inertia force, and the compression heats and provides the fluid, thereby heating a heating target fluid. The device includes a rotation motor that provides a rotation force. The rotor is connected to the rotation motor and is rotated by it, as a magnet is provided on an outer circumferential surface. It also includes a stator that is fixed to the outside of the rotor and on which a coil facing the rotor magnet is located; an inertia force generating part that generates the inertia force to the rotor through the accumulation of weight by the fluid while supplying the fluid to the rotor; and a boiler that compresses the fluid discharged from the rotor and generates elevated heat.

Finally, document 000746-2019/DIN refers to an electric generator by means of electromagnetic shielded pistons including two drive magnets, twenty-three coils and two supports on which a piston shaft with 46 inductor magnets is installed, in which the generator includes a power PWM circuit and a power controller system for voltage and frequency stabilization.

In this sense, it is clear that there is an unmet need to provide a power generating device that allows the use of eddy currents and self-induced magnetic fields, that in situations in which conventional electric generators currently operate represent a disadvantage reducing as they its efficiency because they produce friction, rotor braking, heating and others. Thus, the magnetic collapse power generating device of the present invention with the configuration of power generating coils takes advantage of the self-induced magnetic fields and counter-electro-motive force generated in the coils in favor of power generation.

SUMMARY

The present invention is directed to a power generation machine or device, comprising permanent magnets, a three-phase system, bifilar coils and a magnet arrangement disposed axially to the generator rotor; and comprising a system embedded by magnetic pulse control software for the moment of magnetic collapse or generation of electric power peaks or valleys, whereby a set of sensors detect the precise angular moment in which the coils have stored the maximum magnetic energy and then trigger their magnetic collapse or generation of electric power peaks or valleys by a switching process controlled by the signals coming from said sensors. All these elements are arranged in the rotor and circumferential stator, which generates electrical energy when moving.

DETAILED DESCRIPTION OF THE INVENTION

Figure 1:
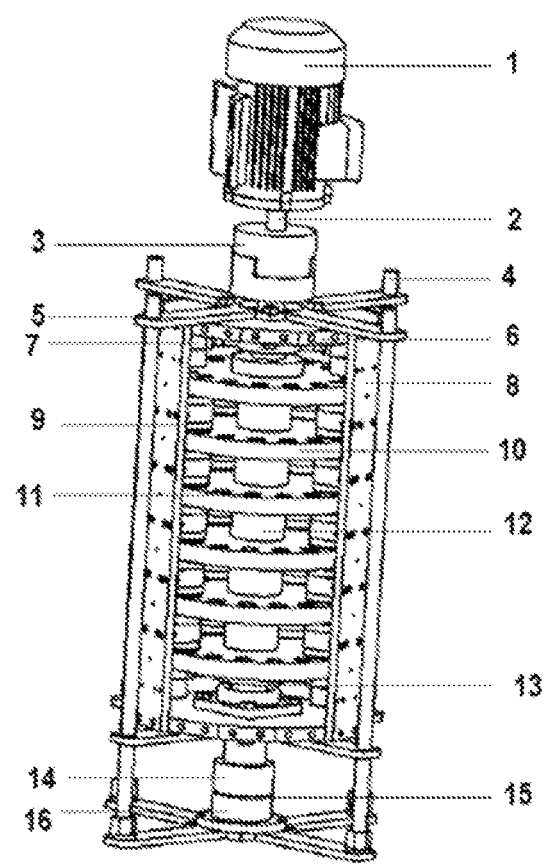
FIG. 1 shows a front perspective view of the power generating device according to the present invention.

The present invention relates to a device or machine for magnetic collapse power generation including an induction motor (1), a motor shaft (2), a magnetic coupling (3), stabilizer bars (4), stabilizing structures (5), coil holder support plates (6), Hall sensors (7), coil holder plates (8), bifilar coils (9), rotor disks (10), inductor magnets (11), rotor spacers (12), a central shaft (13), an upper magnet holder (14), a frictionless space (15) and a lower magnet holder (16), wherein the central shaft (13) supports along its length rotor disks (10) having a plurality of inductor magnets (11) and the rotor disks (10) are spaced apart from each other by means of rotor spacers (12) and the set of rotor disks (10) and rotor spacers (12) are located between two coil holder support plates (6). The central shaft (13) is connected by one of its ends to a magnetic coupling (3) and by the other end to a magnetic levitation system formed by the upper Magnet Support (14) and the lower Magnet Support (16) and the frictionless space (15) formed between said supports and the system comprising the central shaft (13) and the components supported by it, are adjusted and secured to the stabilizing structures (5) at their ends, which are connected through stabilizer bars (4).

As shown in FIG. 1, the magnetic collapse power generating device according to the present invention may comprise an induction motor (1) which may be a motor with any capacity, for example capacities between 2 HP and 15 HP, which is equivalent to 1.49 KW and 11.18 KW. The function of the induction motor (1) is to maintain in rotation a central shaft (13) at rotational speeds, for example, but not limited to between 450 RPM and 3600 RPM in order to provide a quantity of volts, for example, but not limited to between 266 Volts to 5400 Volts per phase which are also assimilated by the electronic system for the use of its peaks produced by the magnetic collapses controlled by hall sensors (7).

The magnetic collapse power generating device according to the invention may have a motor support (not shown), which is an element that may be constructed of a resistant material, for example, but not limited to Duraluminium and its function is to attach the induction motor (1) to the structure of the magnetic collapse power generating device according to the present invention for a suitable mechanical power transfer thereof. Additionally, the structure of said motor support allows a total stability of the induction motor (1) and the compartment for the installation of the general magnetic coupling of the device according to the invention.

Figure 2:
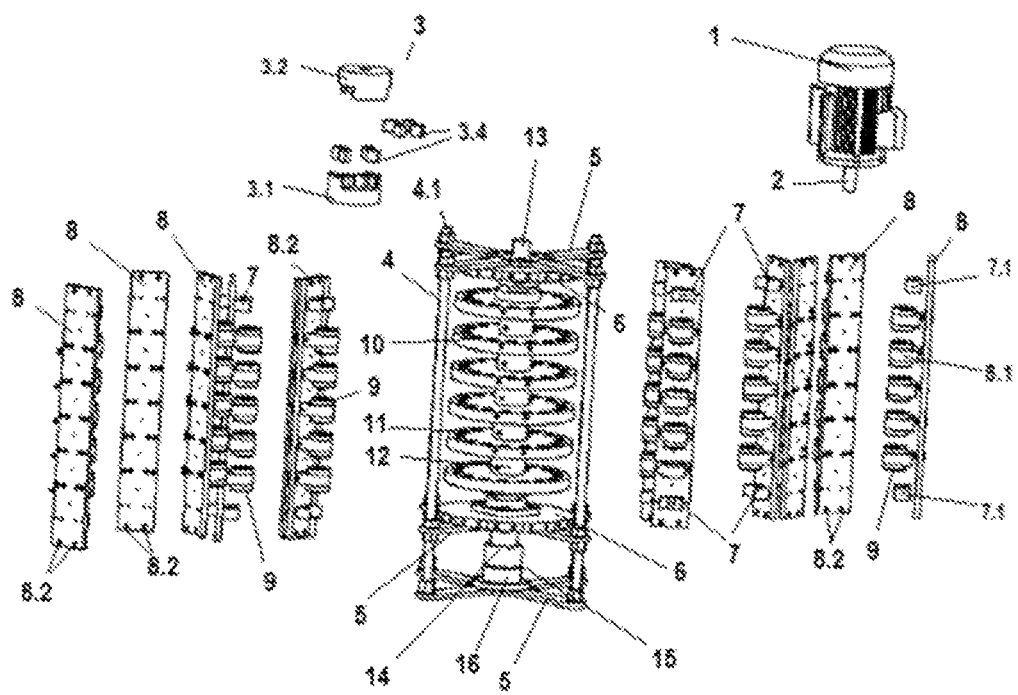
FIG. 2 shows an exploded view of components of the power generating device according to the present invention.

The motor shaft (2) as shown in FIGS. 1 and 2, may have any appropriate length according to the number of rotor disks (10) and the diameters thereof according to the power to be generated, which transfers the mechanical power of the induction motor (1) towards a magnetic coupling (3) and this in turn towards a central shaft (13) of the power generating device by magnetic collapse according to the present invention.

Figure 3:
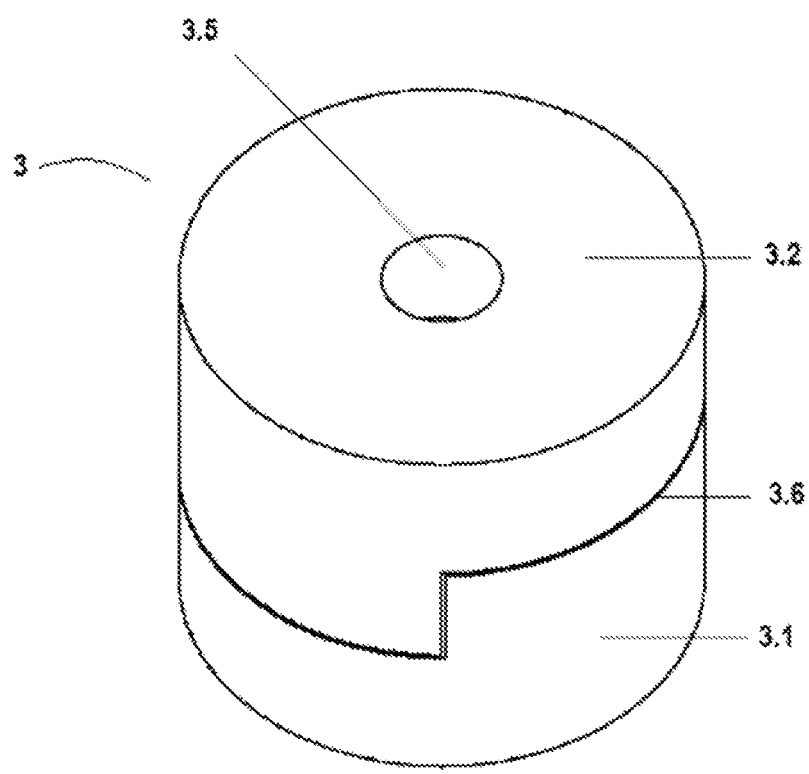
FIG. 3 shows the external configuration of the magnetic coupling (3) of the power generating device according to the present invention.
Figure 4:
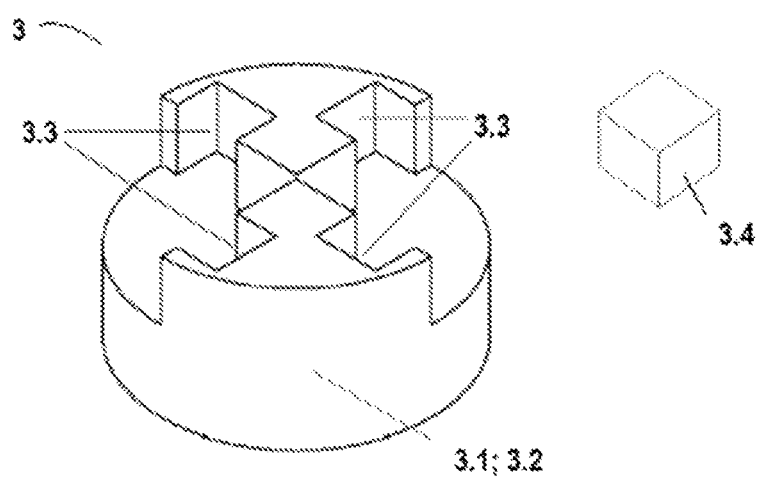
FIG. 4 shows the internal structure of the magnetic coupling (3) and the magnets that are included in said internal structure of the magnetic coupling (3).

The magnetic coupling (3) which serves as a junction bridge between the induction motor (1) and the central shaft (13) as shown in FIGS. 1, 2 and 3, comprises a lower body (3.1) and an upper body (3.2) which fit symmetrically with each other and comprise inner compartments (3.3) (FIG. 4) for receiving tightly fitting high power magnets (3.4), preferably four magnets with suitable dimensions for their perfect fit within the compartments (3.3). These magnets (3.4) provide a repulsion force and prevent any physical contact between their surfaces creating a frictionless space (3.6) as shown in FIG. 3. The upper (3.2) and lower body (3.1) have holes (3.5) in their outer parts in order to insert the central shaft (13) and the motor shaft (2), respectively. In this sense, all physical contact between the motor shaft (2) and the central shaft (13) is eliminated, thereby also achieving the elimination of friction and heating and achieving an efficient transfer of power from the inductor motor (1) to the system of the power generating device by magnetic collapse. FIG. 4 also shows the preferred shape of the high power magnets (3.4). Nevertheless, the configuration of the compartments (3.3) and the high power magnets (3.4) may have any configuration, e.g., cylindrical.

As illustrated in FIGS. 1 and 2, the magnetic collapse power generating device according to the invention may comprise 4 or more stabilizer bars (4) according to the increase in the required output power and thus the increase in device size. In the embodiment shown in FIGS. 1 and 2, the device includes four stabilizer bars (4). These bars can be of any resistant material, for example, but not limited to stainless steel, as this material is diamagnetic and does not influence the magnetic fields acting on the device according to the invention. These stabilizer bars (4) provide stability to the entire system or device and provide support to the entire structure of the magnetic collapse power generating device of the invention.

Figure 5:
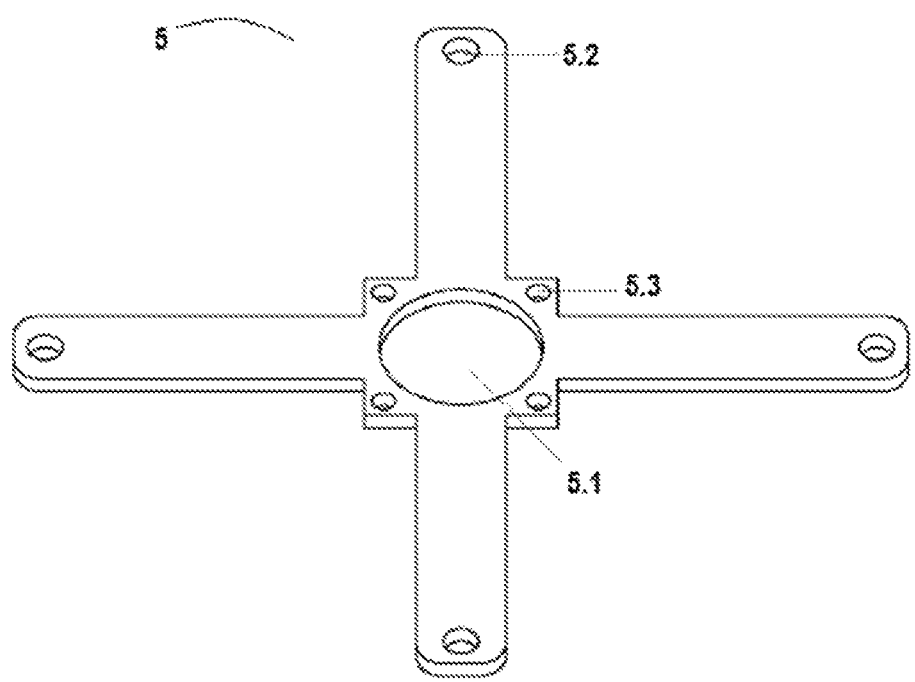
FIG. 5 shows the stabilizing structure (5) that provides stability and support to the power generating device according to the present invention.

The stabilizer bars (4) are connected at their ends by means of stabilizing structures (5), which may be shaped according to the number of stabilizer bars (4) employed. As shown in FIG. 5, the upper stabilizing structure (5) and the two lower structures (5) have an "X" shaped configuration with a central bore (5.1) for receiving the magnetic coupling (3) at one end and at the other end the magnetic levitation system. The stabilizing structures (5) have at holes (5.2) at the ends through which each stabilizer bar (4) enters, which are secured by nuts (4.1) and holes (5.3) through which coil holder support plates (6) are secured. The stabilizing structure (5) located at the bottom of the device differs from the other two in that it has no central hole and fixes a magnetic levitation system also located at the bottom of the device. The material of these stabilizing structures (5) can be of any resistant material, preferably stainless steel. The rectangular or "X" shape may be pentagonal, hexagonal or octagonal depending on the scaling and the manufacturing dimensions of the device according to the present invention.

Figure 6:
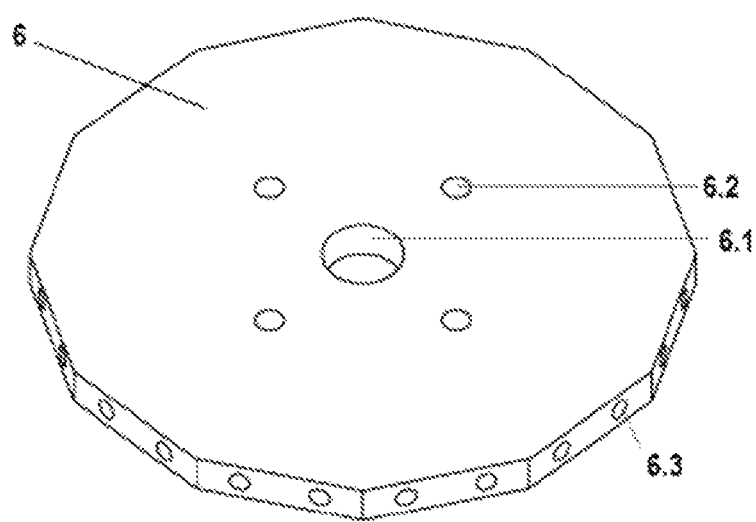
FIG. 6 shows a configuration for coil holder support plates (6) according to the power generating device of the present invention.

According to FIG. 6, the device according to the present invention further includes coil holder support plates (6), preferably one at the top and one at the bottom of the device and which have a design suitable for coupling coil holder plates (8) through holes (6.3) located on the entire perimeter of the coil holder support plates (6). The material of these coil holder support plates (6) may be, but is not limited to, acetal and other polymers that are thermoplastic materials with adequate strength to withstand pressure work. As shown in FIG. 6, the coil holder support plate (6) has a concentric hole (6.1) surrounded by equidistant holes (6.2) arranged around the concentric hole (6.1) to secure the system to the stabilizing structures (5) through screws. The plate can have a circular or flat polyhedral shape with a suitable diameter, for example, but not limited to 330 mm and 1,200 mm or more and a thickness of between 30 mm and 60 mm or more, wherein the holes (6.3) are arranged in order to couple coil holder plates (8) at their ends and in the entire contour of the upper and lower coil holder support plates (6) by means of screws.

Figure 7:
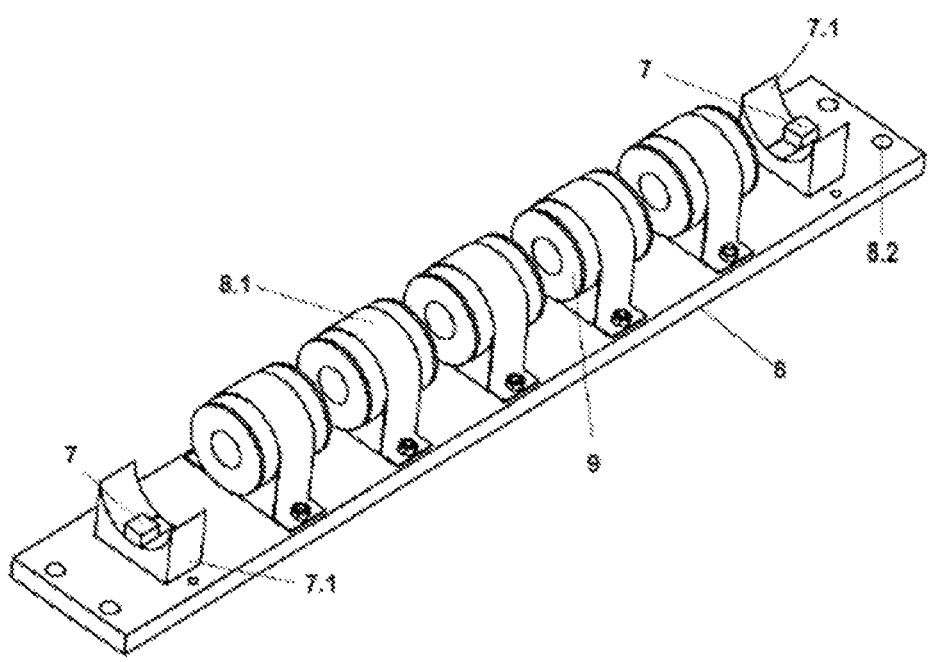
FIG. 7 shows a configuration of a coil holder plate (8) according to the power generating device of the present invention.

According to FIG. 7, the coil holder plates (8) mentioned above, have a rectangular structure made of a suitable material, for example, stainless steel. The coil holder plates (8) support a plurality of bifilar coils (9), an example of 5 bifilar coils (9) is shown in FIG. 7, which are adjusted to the surface of the coil holder plate (8) by means of adjustment plates (8.1). In one embodiment of the invention, the magnetic collapse power generating device may comprise 12 coil carrier plates (8) and each of them with five bifilar coils (9) with their corresponding adjustment plates (8.1) which are joined by means of their ends with the coil holder support plates (6) by screws passing through the holes (6.3) of the coil holder support plates (6) and the holes (8.2) at the ends of the coil holder plates (8).

The coil holder plates (8) further comprise at their ends Hall sensors (7) located on a base (7.1), wherein the Hall effect sensors (7) or simply Hall sensors (7) have the function of measuring the magnetic fields or currents or for determining the position in which the system is. In that sense, as a position sensor or detector for magnetic components, Hall sensors (7) are especially advantageous if the variation of the magnetic field is comparatively slow or null. The function of the Hall sensors (7) is to detect the moment in which the inductor magnets (11) that are located in the rotors (10) and that correspond to a certain phase of the three-phase that is in a precise angular alignment with their respective bifilar coils (9) to transfer its magnetic charge to it, which will be used by the magnetic collapse phenomenon. As indicated above and as shown in FIG. 7, the Hall sensors (7) are located diametrically on each of a coil holder plates (8). Additionally, the hall sensors (7) also detect the precise alignment between the coils (9) of a given line (L1, L2 or L3) with their respective inductor magnets (11) that turn the coils (9) "on" and "off" and force magnetic collapses to produce high voltage peaks in the terminals of the coils (9), taking advantage of the eddy current and self-induced magnetic fields to produce useful electrical current.

The bifilar coils (9) supported by the coil holder plates (8) are each composed of two conductors, which can be of any caliber, for example, but not limited to 23 AWG (0.643 mm diameter with enamel). The bifilar coils (9) may further comprise a plurality of pairs of rows, for example, but not limited to 42 pairs of rows by a plurality of layers, for example, but not limited to 18 layers, to form a plurality of turns, for example, but not limited to 756 turns per conductor; and being a Bifilar this coil may have a plurality of turns, for example, but not limited to 1,512 turns in total. The total number of turns can vary depending on the coil size to be used to generate a certain power, it can even have 3,000 or more turns in total depending on the wire gauge to be used.

In the construction of this bifilar coil (9), two closely spaced parallel windings and a counter-coil connected in series are involved since the final end of one of them is connected to the initial end of the other. These types of coils represent an advantage over traditional coils that have a single wire, in that to adequately increase their potential, their turns are wound in such a way that they provide a greater potential difference between their adjacent turns. This way, the energy stored by this coil is proportional to the square of the potential difference between adjacent turns.

The concrete advantage of the bifilar coils (9) is the ratio of the potential difference generated between adjacent turns compared to traditional monofilar coils.

Figure 8:
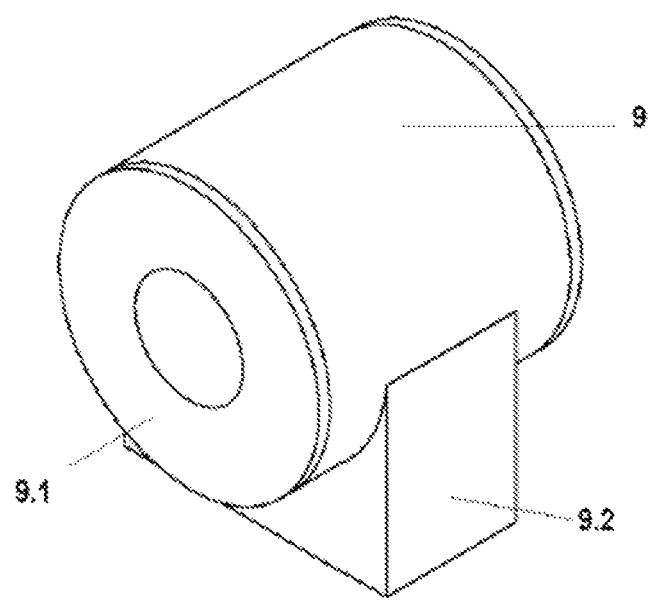
FIG. 8 shows the structure of a bifilar coil (9) according to the power generating device of the present invention.

As shown in FIG. 8, each bifilar coil (9) is on a coil base (9.2) and wound on a coil reel (9.1) and can be of any desired size and in accordance with the proposed sizing for the device of the invention. For example, the bifilar coils (9) may measure, but are not limited to dimensions of 60 mm or more in height as long as the distance between the inductor magnets (11) and the coils (9) is only less than or equal to 2 millimeters.

Figure 9:
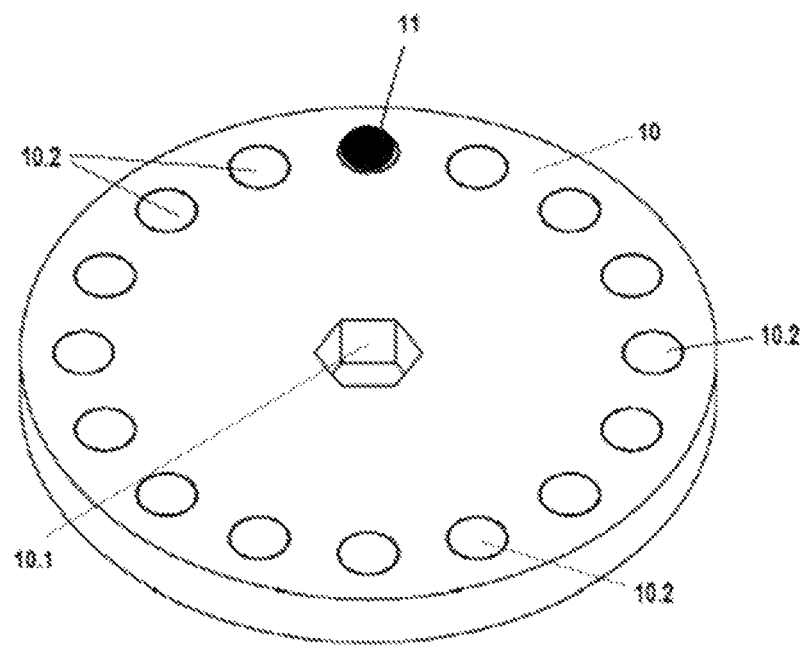
FIG. 9 shows a configuration of a rotor disk (10) according to the power generating device of the present invention.

The magnetic collapse power generating device according to the invention further includes an array of rotor disks (10) as shown in FIGS. 1 and 2, wherein each rotor disk (10) may have a diameter between 330 mm and 1660 mm or more and a width between 30 mm and 40 mm or more, wherein these dimensions may vary according to the design requirements of the device to be constructed. The material in which the rotor disks (10) are manufactured can also be made of acetal thanks to the high resistance of this material to deformation. As shown in FIG. 9, each rotor disk (10) includes a plurality of holes (10.2), for example, but not limited to 16 symmetrically located holes toward the outside of the rotor disk (10). As shown in FIG. 9, an inductor magnet (11) is housed or installed in each of the holes (10.2), wherein this configuration for axial flow makes it possible to ensure that the inductor magnet (11) does not leave its housing since the structure itself causes it to remain inside the hole (10.2) by the effect of centrifugal force. This configuration overcomes the drawbacks of rotors with conventional protruding poles.

Additionally, each rotor disk (10) comprises a concentric bore (10.1) with a hexagonal configuration through which the central shaft (13) passes, wherein said configuration decreases the wear produced by the use and allows to increase the fixation and traction of each rotor disk (10). The rotor disks (10) are a major component of the magnetic energy generating device according to the present invention, since it allows axially inducing the bifilar coils (9) by efficiently transferring their magnetic field strength thereto and thus allowing efficient storage of energy in the form of a magnetic field in the respective coil (9), wherein the energy transfer process is controlled by the Hall sensors (7).

Figure 10:
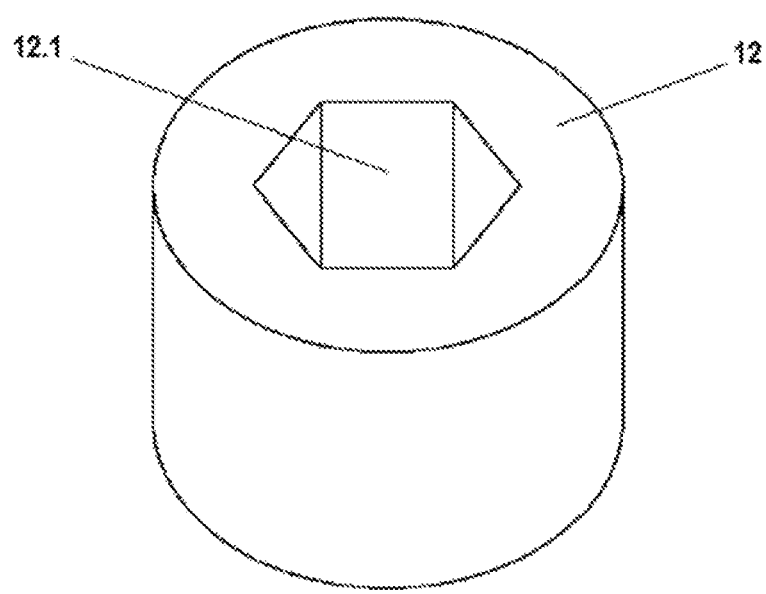
FIG. 10 shows a configuration of a rotor separator (12) according to the power generating device of the present invention.

The configuration of the power generating device according to the present invention also comprises a plurality of rotor spacers (12) as shown in FIGS. 1 and 2, which are structures designed and constructed in acetal as being a highly deformation-resistant material and are cylindrical segments with a concentric hole (12.1) with hexagonal configuration as illustrated in FIG. 10. These rotor spacers (12) as their name indicates, separate and maintain the proper distance between the rotor disks (10) and the bifilar coils (9) and also maintain the uniform distance between the inductor magnets (11) and the bifilar coils (9) for more efficient induction. The size and dimensions of this and other elements of the electrical power generating device by magnetic collapse according to the present invention will depend on the dimensions to which the device is desired to scale. For example, the rotor spacers (12) may have a diameter of 90 mm and a height of 64 mm or more. The diameter and height of the rotor spacers (12) may vary according to the scaling of the generator due to the variation in the dimensions of the coils (9) to be used in each case.

Figure 11:
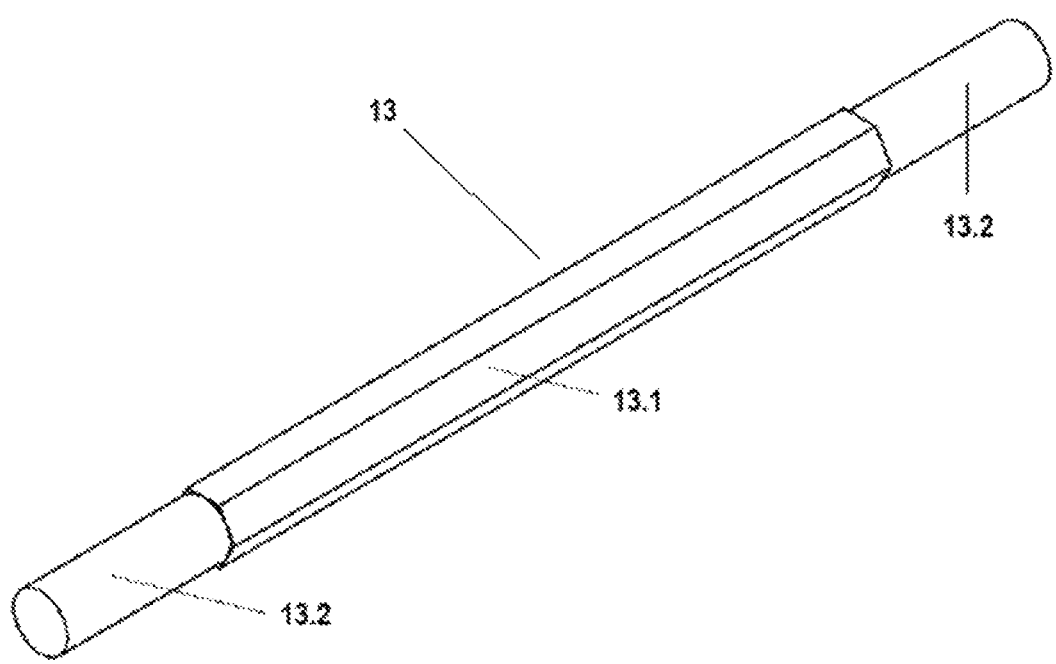
FIG. 11 shows a configuration of a central shaft (13) according to the power generating device of the present invention.

The power generating device according to the present invention, as mentioned above, includes a central shaft (13) which corresponds to a bar-like structure which can be made of stainless steel wherein the central section (13.1) as shown in FIG. 11 has a hexagonal configuration, i.e. a hexagonal-shaped central section spanning a length of the bar between 60% and 70% of the total length of the central shaft (13) from the average length of said central shaft (13), and the rest of the length (ends 13.2) is cylindrical or circular and is equally distributed at said ends of the central shaft (13) to be joined with the magnetic coupling (3) and with the magnetic levitation system at each of its ends, respectively.

The central section (13.1) with hexagonal configuration of the central shaft (13) fits precisely with the holes (10.1) of the rotor disks (10) and of the holes (12.1) of the rotor spacers (12), thereby ensuring that the force produced in the rotation does not wear the material and that adequate traction is always maintained. In addition, its diameter makes it possible to efficiently withstand the stress produced by the torque and the rotation speed produced by both the induction motor (1) and the rotation speed produced by the same device after having disconnected the induction motor (1).

Figure 12:
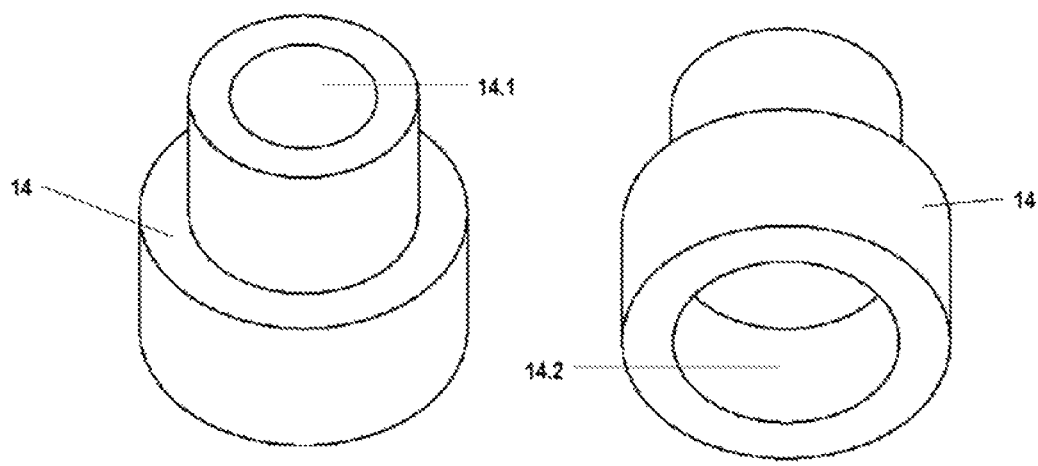
FIG. 12 shows the configuration of an Upper Magnet Holder (14) according to the power generating device of the present invention.
Figure 13:
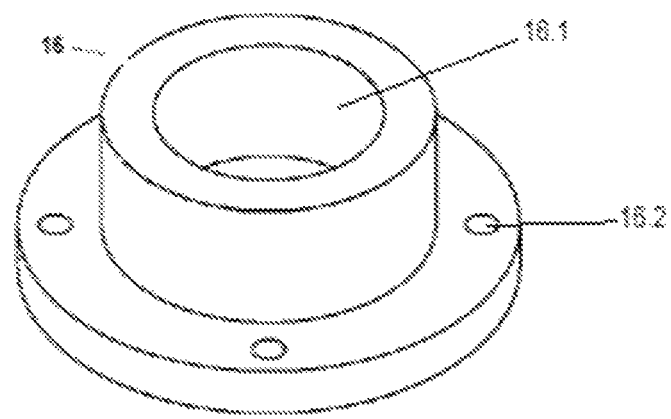
FIG. 13 shows a configuration of the Lower Magnet Holder (16) according to the power generating device of the present invention.
Figure 14:
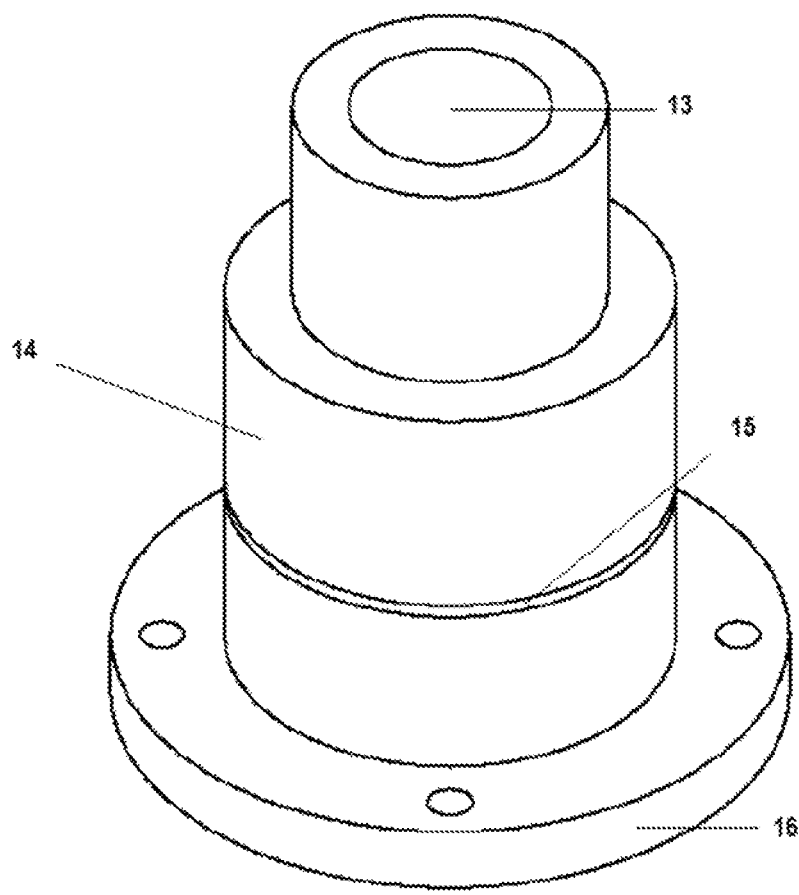
FIG. 14 shows a configuration of a magnetic levitation system formed by the Upper Magnet Holder (14) and the Lower Magnet Holder (16) and the frictionless space (15) that is formed between the Upper Magnet Holder and the Lower Magnet Holder according to the power generating device of the present invention.

As for the cylindrical parts or sections (13.2) of the central shaft (13) at the ends of said central shaft, they allow respective coupling with the induction motor (1) and the magnetic coupling (3) at the top and with the magnetic levitation system comprised of the Upper Magnet Support (14), the Lower Magnet Support (16) and the frictionless space (15) that is formed between these two supports (FIGS. 12, 13 and 14).

From the figures and the configuration indicated throughout this description, the central shaft (13) is the backbone of the power generating device, according to the present invention, and performs the functions of coupling the system of the rotor disks (10) with the induction motor (1) via the magnetic coupling (3) and coupling the system of the rotor disks (10) with a magnetic levitation system (14, 15 and 16) and for the installation of said rotor disks (10) and rotor spacers (12) and the coil holder support plates (6).

The electrical power generating device according to the present invention further comprises a Magnetic Levitation System, which includes an upper magnet support (14) (FIG. 12), a frictionless space (15) and a lower magnet support (16) (FIG. 13). These elements of the Magnetic Levitation System allow the weight of both the central shaft (13) and the rotor disks (10) of the rotor spacers (12) and the inductor magnets (11) to be held and allows suspension in a magnetic field without any friction or wear in the rotation process, regardless of the speed at which the device operates in accordance with the present invention. As shown in FIG. 12, the upper magnet holder (14) has an upper compartment (14.1) for housing the central shaft (13) and a lower compartment (14.2) for housing a levitation magnet (14.3) not shown, which is a magnet with the same configuration as the compartment (14.2), for example cylindrical, in which the levitation magnet is made of neodymium. In relation to the lower magnet holder (16) as illustrated in FIG. 13, it comprises a levitation magnet compartment (16.1) housing a levitation magnet (16.3) not shown, which like the levitation magnet (14.3) has the same configuration of the compartment (16.1), for example cylindrical and can be made of neodymium. The lower magnet holder (16) also has holes (16.2) for fixing bolts.

In this sense, the Magnetic Levitation System reduces the consumption of the induction motor (1) since by taking advantage of the magnetic repulsion phenomenon, it pushes the central shaft next to the rotor system upwards, counteracting the effect of gravity and that by its weight it would cause a rotational stress that would affect the bearings (not shown) located in the stabilizing structure (5) and therefore producing heat and friction, which reduces the efficiency of the motor by requiring more energy for its rotation process.

Under this configuration, both the central shaft (13) together with the rotor systems (10) and inductor magnets (11) will decrease their weight in proportion to the repulsion force of the levitation magnets (14.3 and 16.3), this being interpreted by the motor (1) as the net weight of the rotor assembly (10) minus the total repulsion weight produced by said magnets. It is not the same to turn an 80 Kg mass than a 8 Kg one.

The device according to the present invention can further optionally comprise one or more inertial disks, since when the device of the invention is related to a synchronous speed rotor regardless of the load extraction to which it is subjected, this disk further allows a much lighter work of the motor. This disk has adequate dimensions proportional to the mass to be rotated and further depends on the dimensions of the device when it is intended to scale its production. Preferably, the weight of the inertial disk may be in a weight ratio, relative to the total weight of the device, of between 30% and 50%. The location of this inertial disk within the system may be at the top and/or bottom of the system of the power generating device according to the present invention.

Figure 15:
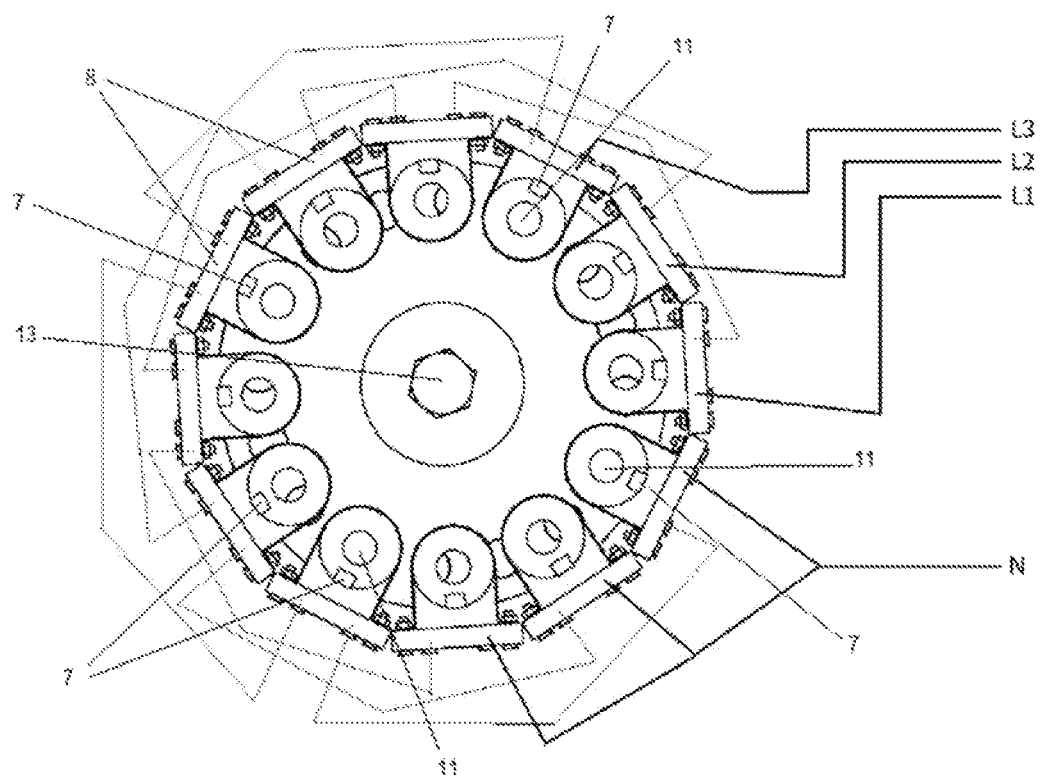
FIG. 15 shows a schematic figure of the connection of the power generator according to the present invention.

As for the operating components, the connection of the magnetic power generator by magnetic collapse of the invention is a three-phase type as shown in FIG. 15, which has a star-like configuration. In it, it can be noted that there are three single-phase outputs (L1, L2 and L3) of the same intensity and a neutral common point (N), which independently go to three circuits that control the pulses generated by the magnetic collapses controlled by a printed circuit board (PCB) and in which the control components, such as transistors, rectifier diodes, resistors and relays are located, which together allow the adequate management of each high voltage pulse produced in each magnetic collapse that occurs in the coils (9). This magnetic collapse is not only beneficial for the production of electrical energy, but also allows the discharge of the coils (9) for the next cycle, a fact that does not happen with conventional systems since said storage of energy in the form of a magnetic field creates the so-called eddy currents that impair the performance and efficiency of the current electrical generators. It should be noted that the computer control software is not embedded in this PCB.

The operation of the magnetic collapse power generating device according to the present invention, is by self-induction. As a first step, the induction motor (1) is connected to an external power supply that can be a power outlet or a battery for starting the rotation process and until the system detects the optimal rotation, for example, of 900 rpm and the levels of electrical energy production are adequate.

During this rotation process, the magnetic field hall sensors (7) located inside the rotor-stator system detect the precise moment at which the coils (9) reach their maximum point of induction by the neodymium magnets (11).

Once the maximum induction point is reached where the maximum number of magnetic force lines pass through the coils (9), the coils (9) are "switched on" forcing the circulation of current by using a "resistance" load, in which the control of said load allows the control of the magnetic field intensity to be stored in the coils (9), and therefore the value of the peak voltage to be produced when the magnetic field collapses in the self-induction process.

Once the energy has been stored in the coils (9) in the form of a magnetic field whose intensity depends on the load to be used and when the magnetic field Hall sensor (7) detects the precise instant in which the optimal alignment is offset, the coils (9) are switched "off". When a coil (9) in which the energy is stored in the form of a magnetic field is turned off, it will collapse forcing the circulation of an electric current in a violent way and with a very high voltage peak. The electrical energy generated in this procedure, which is still alternating electrical energy, is transformed into direct current by means of a rectifier bridge and is stored in a capacitor bank (17) as shown in the schematic in FIG. 16 and said stored energy is equalized for its respective use modulating its length, amplitude and frequency according to the electrical energy quality standards stipulated by the competent authorities.

In this sense, since the electrical energy generated is greater than its linear input, the induction motor (1) is then self-powered by it, becoming a permanent production cycle while the Hall sensors (7) do not detect any fault or the user decides to turn off the generator.

Figure 16:
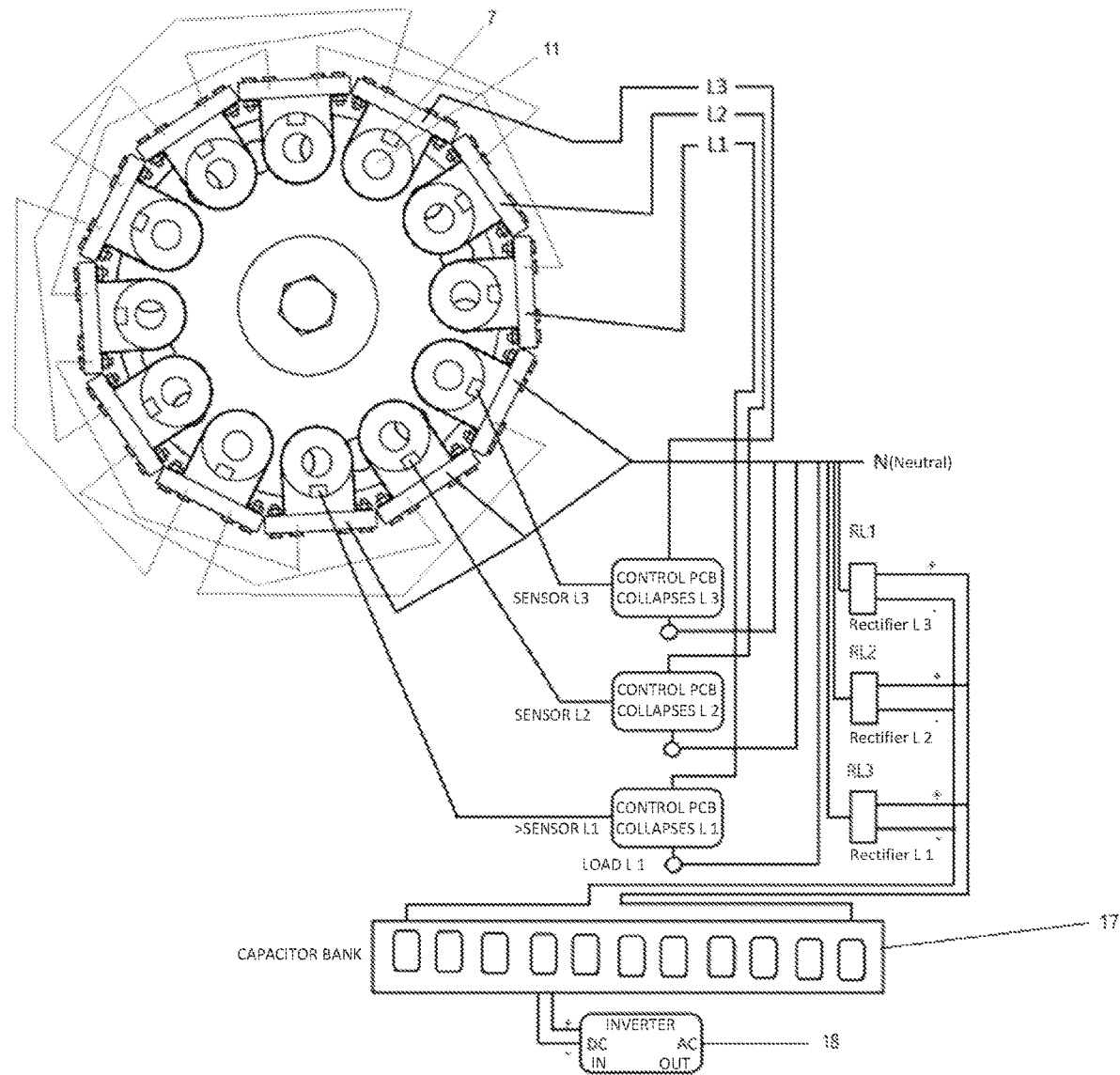
FIG. 16 shows a complete schematic figure of the power generator connection according to the present invention.
Figure 17:
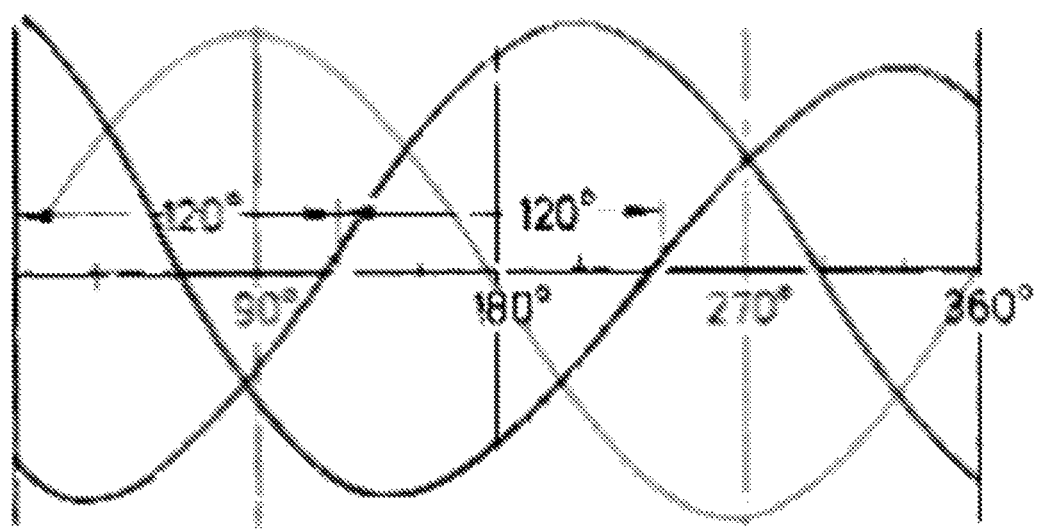
FIG. 17 shows a diagram of single-phase generators working consecutively whose output waves will have a 120° offset from each other.

The complete diagram of the connections of the magnetic collapse power generating device is shown in FIG. 16 in the upper left part, shown as schematics, illustrates the upper part of a three-phase generator where the location of the 12 coils (9) and the 16 inductor magnets (11) can be found. A three-phase generator is equivalent to having 3 single-phase generators working consecutively whose output waves will have a 120° offset from each other as can be seen in FIG. 17. Therefore, there are 3 outputs which are the lines L1, L2 and L3, and a common point that is the Neutral N. In the embodiment shown in FIGS. 15 and 16, because of having 12 producing coils, at the time to, 4 coils (9) will be aligned with their respective inductor magnets (11) so that the peak voltage is generated in the output L1. Also, at the time t1, 4 coils (9) will be aligned with their respective inductor magnets (11) so that the peak voltage is generated in the output L2, and at the time t2, 4 coils (9) will be aligned with their respective inductor magnets (11) so that the peak voltage is generated in the output L3. The point N is common, so it represents the other line that would be present in a single-phase generator, or more clearly; in a plug the live line corresponds to the output lines L1, L2 or L3 and the other line corresponds to the neutral N. Each output line L1, L2 and L3 is connected to its respective control PCB where the switches are controlled.

For controlling the switches, Hall sensors (7) are installed in the stator (where the coils are located—the set of coil holder plates), located and perfectly aligned with the lines L1, L2 and L3 offset 120° from each other. When the Hall sensor (7) of the L1, L2 or L3 lines detects the precise angular alignment of the coils (9) corresponding to said line with their respective inductor magnets (11), the PCB switches the coils (9) "on", connecting the load forcing the circulation of current in them and therefore the creation of a magnetic field. It is the precise alignment that indicates that it is the maximum point of energy production of the coils (9) and, therefore, the maximum number of magnetic force lines are passing through it.

When the Hall sensor (7) detects that this alignment has been lost due to rotation, the coils (9) are physically disconnected, forcing said magnetic field to collapse, generating a high voltage pulse in their terminals, which will be directed towards their corresponding rectifiers RL1, RL2 and RL3 (FIG. 16) for their polarization and their respective storage in the capacitor bank (17).

The capacitor bank (17) whose capacity depends on the power of the generator, is an array that allows the storage of the energy produced by the generator as a battery. From this bank (17) come two direct current lines that enter an Inverter (18), whose capacity also depends on the capacity of the generator and whose function is to provide alternating current, whether this is single-phase or three-phase for use.

It should be noted that the Inverter (18) already has the necessary elements to provide high quality energy according to the standards of electrical energy as they are already approved and authorized by their respective suppliers.

As an example, the fields in which the magnetic collapse power generating device according to the present invention, may have applications are production processes, mining fields and camps, populations without access to electrical energy, and domestic use, among others.

A person skilled in the art will understand that a number of magnetic collapse power generating devices according to the invention, may be placed in series or parallel arrangements in order to increase the power output.

The present invention also considers the use of the magnetic collapse power generating device for the production of electrical energy.

EXAMPLES

Example 1

A magnetic collapse power generating device was constructed in accordance with the present invention, but without the magnetic levitation system. A configuration of two rotors, two rotor spacers and 16 magnets was used for it. The structure had an approximate weight of 14 kg (only the rotation elements were considered). A consumption of 91.7 watts was obtained in this case.

Example 2

In another embodiment, a magnetic collapse power generating device according to the present invention, was constructed using the magnetic levitation system. A configuration of six rotors, five rotor spacers and 96 magnets was used, and the structure had an approximate weight of 46 kg (only the rotation elements were considered). A consumption of 72.1 watts was obtained in this case.

In relation to the results above, it can be concluded that although the rotation set of the magnetic generator according to example 2 is 329% heavier than the rotation set of the magnetic generator of example 1, its consumption is approximately 21.37% less, thereby proving that the arrangement of the elements in example 2, including the magnetic levitation system, is much more efficient.

The invention claimed is:

1. A magnetic collapse power generator comprising:
   an induction motor (1);
   a motor shaft (2);
   a magnetic coupling (3);
   stabilizer bars (4);
   stabilizing structures (5);
   coil holder support plates (6);
   Hall sensors (7);
   coil holder plates (8);
   bifilar coils (9);
   a plurality of rotor disks (10);
   a plurality of inductor magnets (11);
   rotor spacers (12);
   a central shaft (13); and
   a magnetic levitation system,
   wherein:
      the motor shaft (2) is configured to transfer mechanical power generated by the induction motor (1) to the magnetic coupling (3),
      the magnetic coupling (3) is interconnected to both the motor shaft (2) and the central shaft (13) and comprises coupling magnets (3.4), the coupling magnets (3.4) configured to exert a first repulsion force against each other such that mechanical power is transferred from the motor shaft (2) to the central shaft (13) without direct physical contact between the motor shaft (2) and the central shaft (13),
      the Hall sensors (7) are configured to detect an alignment of an electromagnetic field and discharge extraction when the bifilar coils (9) and the inductor magnets (11) are aligned,
      each bifilar coil (9) comprises two closely spaced parallel windings configured to neutralize their self-induction,
      the central shaft (13) supports along its length the rotor disks (10) with the plurality of inductor magnets (11),
      the rotor disks (10) are spaced from each other by the rotor spacers (12),
      the rotor disks (10) and the rotor spacers (12) are located between two coil holder support plates (6),
      the central shaft (13) is connected at one of its ends to the magnetic coupling (3) and at its other end to the magnetic levitation system,
      the central shaft (13) is secured to the stabilizing structures (5) at each end by the stabilizer bars (4),
      the magnetic levitation system comprises an upper levitation magnet (14.3) and a lower levitation magnet (16.3), the upper and lower levitation magnets (14.3, 16.3) configured to exert a second repulsion force against each other, the second repulsion force counteracting at least a portion of the weight of the plurality of rotor disks (10), the plurality of inductor magnets (11), and the central shaft (13), and
      the magnetic coupling (3) comprises a lower body (3.1) and an upper body (3.2) which fit symmetrically with each other and comprise inner compartments (3.3) that tightly house the coupling magnets (3.4), and wherein the coupling magnets (3.4) prevent any physical contact between their respective surfaces and create a frictionless space (3.6).

2. The magnetic collapse power generator according to claim 1, wherein the stabilizer bars (4) comprise four or more stabilizer bars (4) that provide stability and support to the structure of the magnetic collapse power generator.

3. The magnetic collapse power generator according to claim 1, wherein each of the bifilar coils (9) comprises two conductors and a plurality of pairs of rows by a plurality of layers to form a plurality of turns per conductor.

4. The magnetic collapse power generator according to claim 1, wherein each rotor disk (10) includes a plurality of holes (10.2) symmetrically located towards an outside of the rotor disk (10), wherein each hole (10.2) houses one of the inductor magnets (11), and wherein each rotor spacer (12) is a cylindrical segment with a concentric hole (12.1) that separates and maintains an appropriate distance between the rotor disks (10) and the bifilar coils (9) and also maintains a uniform distance between the inductor magnets (11) and the bifilar coils (9).

5. The magnetic collapse power generator according to claim 1, wherein the central shaft (13) is a bar-like structure with a hexagonal-shaped central section, wherein a length of the hexagonal-shaped central section is between 60% and 70% of the total length of the central shaft (13) and a remainder of the total length of the central shaft (13) is cylindrical or circular and is equally distributed at ends (13.2) of the central shaft (13).

6. The magnetic collapse power generator according to claim 1, wherein the magnetic levitation system comprises an upper magnet holder (14), a lower magnet holder (16), and a frictionless space (15) formed between the upper and lower magnet holders (14, 16).

7. The magnetic collapse power generator according to claim 1, further comprising a capacitor bank (17) that regulates and calibrates energy produced by the magnetic collapse power generator.

8. The magnetic collapse power generator according to claim 1, further comprising one or more inertial disks.

9. The magnetic collapse power generator according to claim 1, wherein the Hall sensors (7) are further configured to detect an alignment between the bifilar coils (9) of one of a plurality of lines (L1, L2, or L3) with respective inducing magnets (11) that turn "on" and "off" the coils (9) and force magnetic collapses to produce high voltage peaks in the terminals of the coils (9), taking advantage of the eddy current and the self-induced magnetic fields to produce useful electrical current.

10. A magnetic collapse power generator comprising:
    an induction motor (1),
    a motor shaft (2);
    a magnetic coupling (3);
    stabilizer bars (4);
    stabilizing structures (5);
    coil holder support plates (6);
    Hall sensors (7);
    coil holder plates (8);
    bifilar coils (9);
    a plurality of rotor disks (10);
    a plurality of inductor magnets (11);
    rotor spacers (12);
    a central shaft (13); and a magnetic levitation system,
wherein:
the motor shaft (2) is configured to transfer mechanical power generated by the induction motor (1) to the magnetic coupling (3),
the magnetic coupling (3) is interconnected to both the motor shaft (2) and the central shaft (13) and comprises coupling magnets (3.4), the coupling magnets (3.4) configured to exert a first repulsion force against each other such that mechanical power is transferred from the motor shaft (2) to the central shaft (13) without direct physical contact between the motor shaft (2) and the central shaft (13),
the Hall sensors (7) are configured to detect an alignment of an electromagnetic field and discharge extraction when the bifilar coils (9) and the inductor magnets (11) are aligned,
each bifilar coil (9) comprises two closely spaced parallel windings configured to neutralize their self-induction,
the central shaft (13) supports along its length the rotor disks (10) with the plurality of inductor magnets (11),
the rotor disks (10) are spaced from each other by the rotor spacers (12),
the rotor disks (10) and the rotor spacers (12) are located between two coil holder support plates (6),
the central shaft (13) is connected at one of its ends to the magnetic coupling (3) and at its other end to the magnetic levitation system,
the central shaft (13) is secured to the stabilizing structures (5) at each end by the stabilizer bars (4),
the magnetic levitation system comprises an upper levitation magnet (14.3) and a lower levitation magnet (16.3), the upper and lower levitation magnets (14.3, 16.3) configured to exert a second repulsion force against each other, the second repulsion force counteracting at least a portion of the weight of the plurality of rotor disks (10), the plurality of inductor magnets (11), and the central shaft (13), and
each coil holder support plate (6) has a concentric hole (6.1) surrounded by equidistant holes (6.2) arranged around the concentric hole (6.1) to secure the coil holder support plate (6) to at least one of the stabilizing structures (5) through screws, and wherein each coil holder support plate (6) also has holes (6.3) in its contour for coupling the coil holder plates (8) at their ends and throughout the contour of the two coil holder support plates (6).

11. The magnetic collapse power generator according to claim 10, wherein the stabilizer bars (4) comprise four or more stabilizer bars (4) that provide stability and support to the structure of the magnetic collapse power generator.

12. The magnetic collapse power generator according to claim 10, wherein each of the bifilar coils (9) comprises two conductors and a plurality of pairs of rows by a plurality of layers to form a plurality of turns per conductor.

13. The magnetic collapse power generator according to claim 10, wherein each rotor disk (10) includes a plurality of holes (10.2) symmetrically located towards an outside of the rotor disk (10), wherein each hole (10.2) houses one of the inductor magnets (11), and wherein each rotor spacer (12) is a cylindrical segment with a concentric hole (12.1) that separates and maintains an appropriate distance between the rotor disks (10) and the bifilar coils (9) and also maintains a uniform distance between the inductor magnets (11) and the bifilar coils (9).

14. The magnetic collapse power generator according to claim 10, wherein the central shaft (13) is a bar-like structure with a hexagonal-shaped central section, wherein a length of the hexagonal-shaped central section is between 60% and 70% of the total length of the central shaft (13) and a remainder of the total length of the central shaft (13) is cylindrical or circular and is equally distributed at ends (13.2) of the central shaft (13).

15. A magnetic collapse power generator comprising:
an induction motor (1);
a motor shaft (2);
a magnetic coupling (3);
stabilizer bars (4);
stabilizing structures (5);
coil holder support plates (6);
Hall sensors (7);
coil holder plates (8);
bifilar coils (9);
a plurality of rotor disks (10);
a plurality of inductor magnets (11);
rotor spacers (12);
a central shaft (13); and
a magnetic levitation system,
wherein:
the motor shaft (2) is configured to transfer mechanical power generated by the induction motor (1) to the magnetic coupling (3),
the magnetic coupling (3) is interconnected to both the motor shaft (2) and the central shaft (13) and comprises coupling magnets (3.4), the coupling magnets (3.4) configured to exert a first repulsion force against each other such that mechanical power is transferred from the motor shaft (2) to the central shaft (13) without direct physical contact between the motor shaft (2) and the central shaft (13),
the Hall sensors (7) are configured to detect an alignment of an electromagnetic field and discharge extraction when the bifilar coils (9) and the inductor magnets (11) are aligned,
each bifilar coil (9) comprises two closely spaced parallel windings configured to neutralize their self-induction,
the central shaft (13) supports along its length the rotor disks (10) with the plurality of inductor magnets (11),
the rotor disks (10) are spaced from each other by the rotor spacers (12),
the rotor disks (10) and the rotor spacers (12) are located between two coil holder support plates (6),
the central shaft (13) is connected at one of its ends to the magnetic coupling (3) and at its other end to the magnetic levitation system,
the central shaft (13) is secured to the stabilizing structures (5) at each end by the stabilizer bars (4),
the magnetic levitation system comprises an upper levitation magnet (14.3) and a lower levitation magnet (16.3), the upper and lower levitation magnets (14.3, 16.3) configured to exert a second repulsion force against each other, the second repulsion force counteracting at least a portion of the weight of the plurality of rotor disks (10), the plurality of inductor magnets (11), and the central shaft (13), and
the coil holder plates (8) support the bifilar coils (9), which are adjusted to the surface of the coil holder plate (8) by adjusting plates (8.1), wherein the coil holder plates (8) further support at their ends the Hall sensors (7) on a base (7.1), and wherein the Hall sensors (7) measure magnetic fields or currents and determine a position of the magnetic collapse power generator.

16. The magnetic collapse power generator according to claim 15, wherein the magnetic levitation system comprises an upper magnet holder (14), a lower magnet holder (16), and a frictionless space (15) formed between the upper and lower magnet holders (14, 16).

17. The magnetic collapse power generator according to claim 15, further comprising a capacitor bank (17) that regulates and calibrates energy produced by the magnetic collapse power generator.

18. The magnetic collapse power generator according to claim 15, further comprising one or more inertial disks.

19. The magnetic collapse power generator according to claim 15, wherein the Hall sensors (7) are further configured to detect an alignment between the bifilar coils (9) of one of a plurality of lines (L1, L2, or L3) with respective inducing magnets (11) that turn "on" and "off" the coils (9) and force magnetic collapses to produce high voltage peaks in the terminals of the coils (9), taking advantage of the eddy current and the self-induced magnetic fields to produce useful electrical current.

* * * * *